(12) United States Patent
Jursinski et al.

(10) Patent No.: US 6,269,152 B1
(45) Date of Patent: Jul. 31, 2001

(54) TELEPHONE ANNUNCIATOR

(75) Inventors: Kenneth A. Jursinski, 5018 Barranca Lora, Pensacola, FL (US) 32514; Thomas W. Adkins, Maumee, OH (US); George A. Topolancik, St. Petersburg, FL (US)

(73) Assignee: Kenneth A. Jursinski, Pensacola, FL (US)

( * ) Notice: Subject to any disclaimer, the term of this patent is extended or adjusted under 35 U.S.C. 154(b) by 0 days.

(21) Appl. No.: 08/904,680

(22) Filed: Aug. 1, 1997

Related U.S. Application Data
(60) Provisional application No. 60/023,067, filed on Aug. 2, 1996.

(51) Int. Cl.[7] ............................. H04M 1/64; H04M 11/00
(52) U.S. Cl. ............................. 379/76; 379/67.1; 379/82; 379/93.05; 379/88.19
(58) Field of Search .............................. 379/67.1, 68, 70, 379/72, 76, 82, 88.04, 88.08, 88.12, 88.24, 29, 48, 88.19, 88.21, 92.04, 93.05, 93.17, 93.35, 157, 201, 215

(56) References Cited

U.S. PATENT DOCUMENTS

| | | | |
|---|---|---|---|
| 3,728,489 | * 4/1973 | Beacham | 179/6 R |
| 4,627,098 | * 12/1986 | Dolikian et al. | 455/70 |
| 5,111,501 | * 5/1992 | Shimanuki | 379/355 |
| 5,265,145 | * 11/1993 | Lim | 379/88 |
| 5,481,594 | * 1/1996 | Shen et al. | 379/67 |
| 5,483,577 | * 1/1996 | Gulick | 379/67 |
| 5,483,579 | * 1/1996 | Stogel | 379/88 |
| 5,497,414 | * 3/1996 | Bartholomew | 379/142 |
| 5,526,406 | * 6/1996 | Luneau | 379/61 |
| 5,559,860 | * 9/1996 | Mizikovsky | 379/58 |

\* cited by examiner

*Primary Examiner*—Fan Tsang
*Assistant Examiner*—Allan Hoosain
(74) *Attorney, Agent, or Firm*—Reising, Ethington, Barnes, Kisselle, Learman & McCulloch, PC

(57) ABSTRACT

A telephone annunciator is disclosed which includes a voice ROM with a prerecorded message which is played back in response to a call received from an unwanted caller. A line current modulator is coupled with the voice ROM and the telephone line. A DTMF tone decoder circuit is coupled with the telephone line for decoding at least one DTMF code signal for producing a trigger signal. An on/off control circuit is responsive to the trigger signal for turning on the voice ROM whereby the telephone line current is modulated by the modulator in accordance with the audio signal from the voice ROM. A start-up power supply includes a storage capacitor and stores a charge in response to a ring signal on the telephone line. A main power supply is connected with the telephone line to receive power therefrom when an off-hook signal is detected.

8 Claims, 3 Drawing Sheets

TELEPHONE ANNUNCIATOR

This application claims the benefit of U.S. Provisional Application No. 60/023,067 filed Aug. 2, 1996.

FIELD OF THE INVENTION

This invention relates to annunciators and more particularly, it relates to a telephone annunciator which may be activated by the telephone user to respond to an incoming call.

BACKGROUND OF THE INVENTION

There is a recognized need for providing a telephone user with some means for screening incoming telephone calls so that an unwanted call can be responded to without the user participating in a telephone conversation. The Walpole et al. U.S. Pat. No. 5,029,198 granted Jul. 2, 1991 describes a telephone call responding system in which the telephone user, upon receiving an incoming telephone call, selects one of a plurality of call response messages by actuating a control key of the responder system corresponding to the desired message. When activated, the responder system connects itself to the telephone line and delivers the selected message. After delivering the message, the responder system disconnects itself from the telephone line until it is once again activated by the user. Phillips U.S. Pat. No. 5,031,205 granted Jul. 9, 1991 discloses an auto response telephone system that allows the user to automatically screen calls and respond without even talking into the telephone receiver. The system may be built into a conventional telephone or it may be in a separate case and operated as an accessory. The system stores several messages. The user picks up the telephone when called to identify the caller and then, the user can either speak to the caller or automatically send one of the prerecorded messages.

A general object of this invention is to overcome certain disadvantages of the prior art and to provide certain improvements in the circuitry and operation.

SUMMARY OF THE INVENTION

In accordance with this invention, an improved device is provided for enabling a telephone user to screen incoming telephone calls and selectively avoid the need for engaging in conversation with an unwanted caller. This is accomplished by the telephone annunciator system which can be provided as a separate unit and easily installed by the telephone user to coact with the user's existing telephone set. The annunciator is of small size and is adapted for high volume production at relatively low cost.

Further, in accordance with this invention, the annunciator is operable with an existing telephone line by connection of it between the telephone set and the line or by connecting it to any extension jack on the telephone line. Operation of the annunciator by the user does not require physical access to the annunciator by the user after it is installed.

Further, in accordance with this invention, the annunciator is activated by the user to play a recorded message by pressing a selected button on the keypad of a conventional tone dial telephone set, such as the Touchtone™ telephone set. This is true in the case of a single telephone set connected with the telephone line or any extension telephone set connected with the telephone line. Preferably, this is accomplished by pressing the star (*) button on the telephone set.

Further, in accordance with this invention, if the annunciator is activated by mistake, for example, the user may deactivate it and stop the message by pressing the selected button again.

Further, in accordance with this invention, the annunciator is powered from the telephone line and need not be provided with its own battery or other separate power source. This is accomplished by a start-up power supply including a storage capacitor coupled with the telephone line for storing a charge in response to a ring signal on the line. Additionally, the annunciator is provided with a main power supply which is connected to the telephone line to receive power therefrom after the handset of the telephone is lifted from the cradle to operate the switch hooks.

Further, the start-up power supply includes a ring detector connected across the telephone line for producing a DC output voltage in response to the ring signal on the telephone line.

Further, in accordance with this invention, the start-up power supply includes a full wave rectifier connected across the telephone line through a coupling capacitor.

Further, in accordance with this invention, a time constant control circuit is coupled with the storage capacitor and the coupling capacitor to bleed the coupling capacitor so that the time constant of the circuit is reduced to provide faster operation of the off-hook detector.

A complete understanding of this invention may be obtained from the detailed description that follows taken with the accompanying drawings.

BEST MODE FOR CARRYING OUT THE INVENTION

Figure 1:
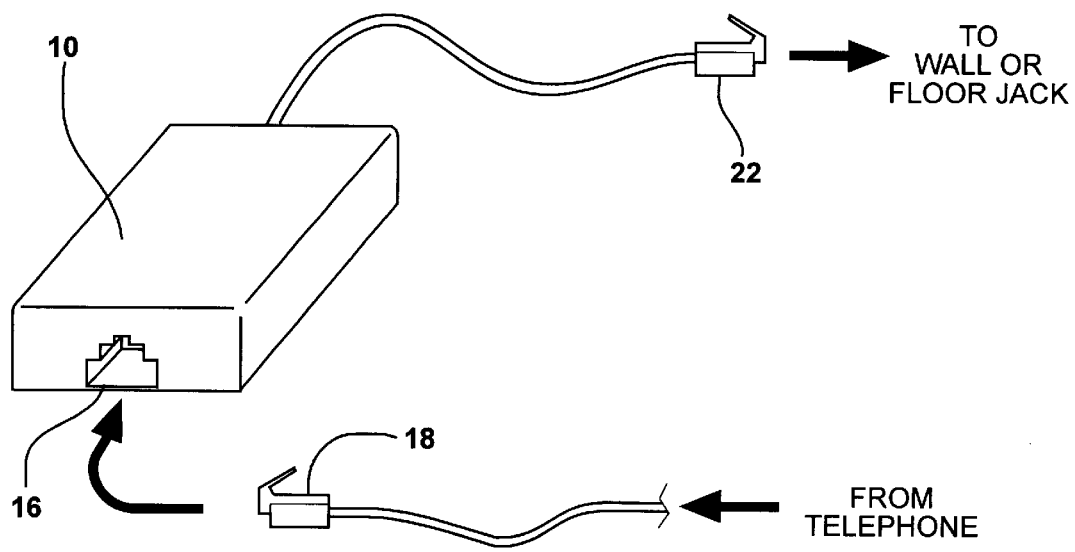
FIG. 1 depicts the annunciator and its connection to a telephone set.

Referring now to the drawings, there is shown an illustrative embodiment of the invention in a telephone annunciator especially adapted for playing a recorded message in response to an incoming telephone call under the control of the telephone user. It will be appreciated as the description proceeds that this invention may be utilized in many different applications and may be implemented in a variety of ways.

Figure 2:
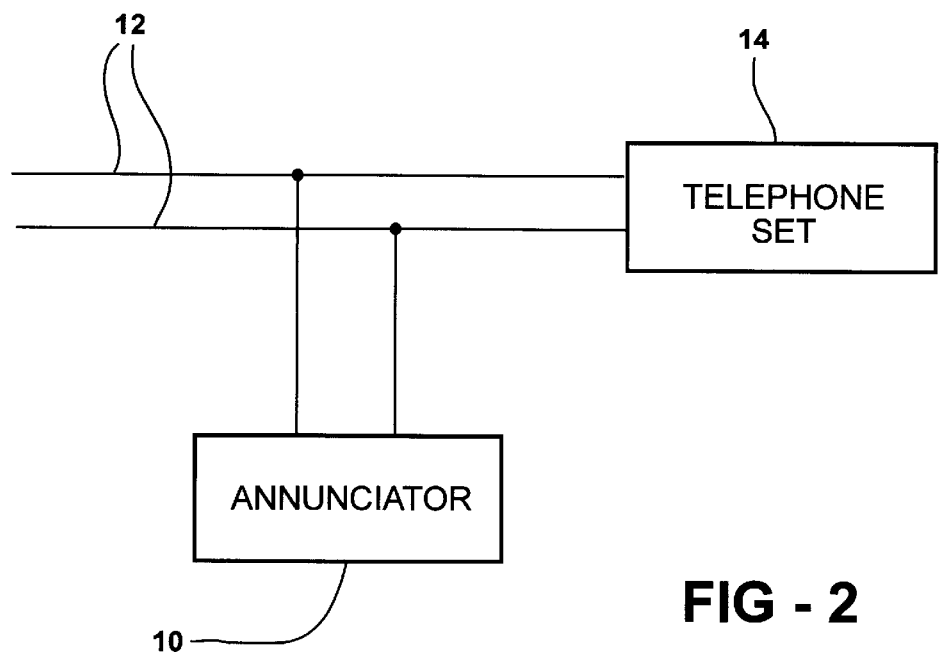
FIG. 2 is a block diagram showing the annunciator with a telephone set.

As shown in FIGS. 1 and 2, the annunciator 10 is connected to the wire pair of the telephone line 12 in parallel with the telephone set 14. The telephone line 12 is connected in a conventional manner to the telephone company central office The annunciator 10 is provided with a jack 16 which is adapted to receive a connector 18 on the end of a connector line of the telephone set. At the other end, the annunciator has a connector line which terminates in a connector 22 adapted to be inserted into a jack connected to the telephone line from the telephone company. The annunciator 10 obtains electrical power for its operation from the telephone line. The telephone line is typically connected at the telephone company exchange to a 48 volt DC source.

Figure 3:
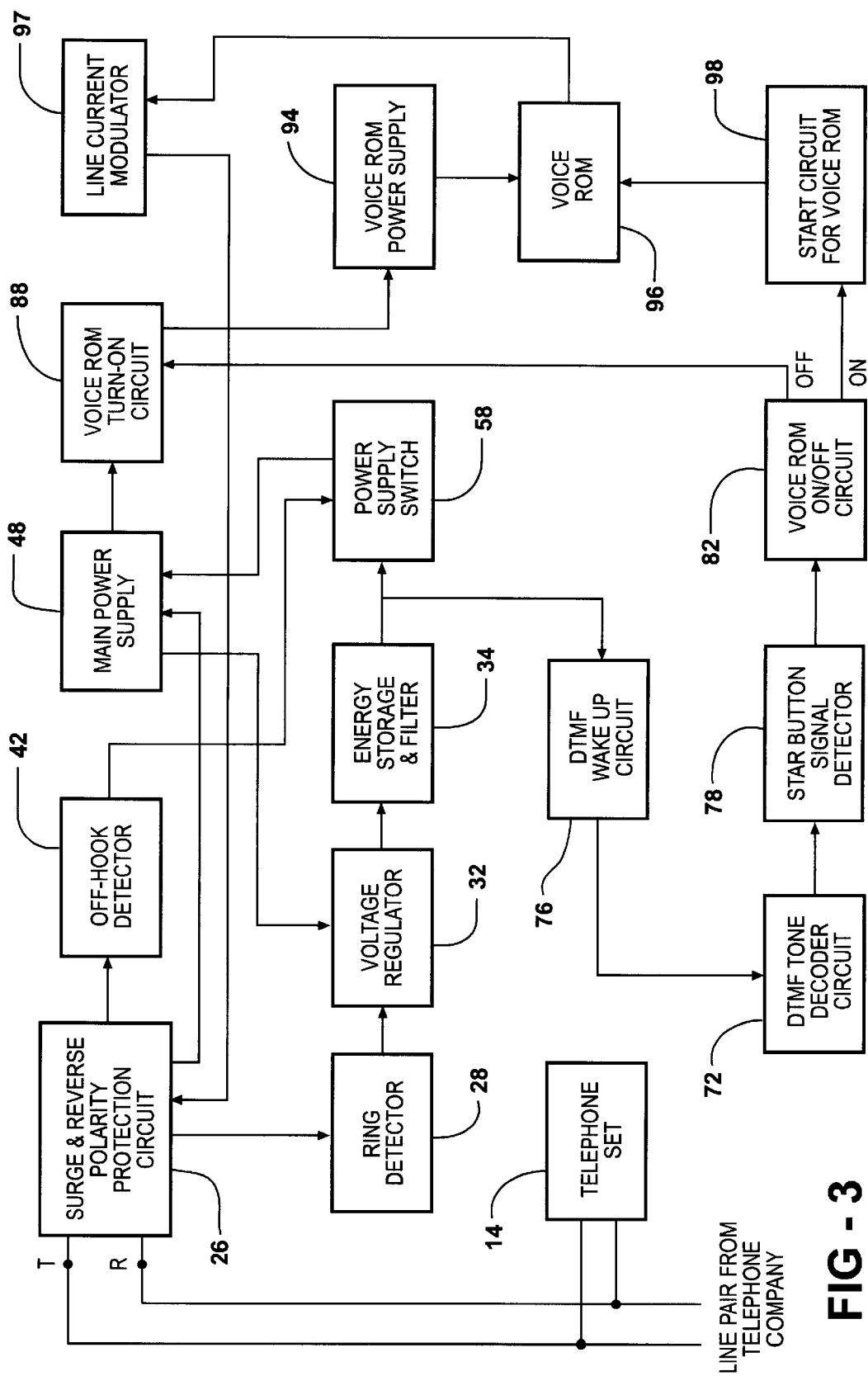
FIG. 3 is a block diagram of the annunciator system of this invention.
Figure 4:
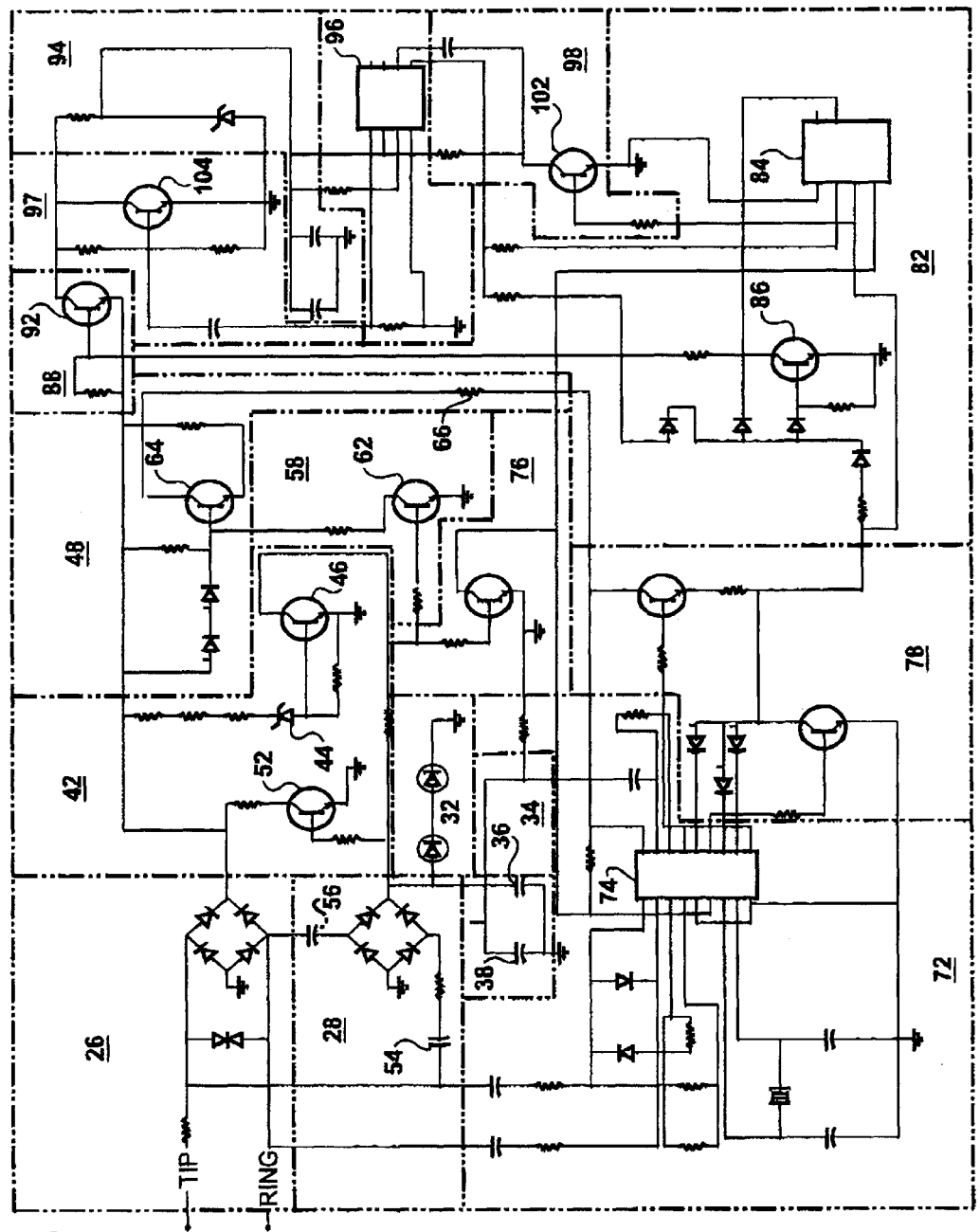
FIG. 4 is a schematic diagram corresponding to the schematic diagram of FIG. 3.

As shown in FIGS. 3 and 4, the tip (T) and ring (R) terminals of the annunciator are connected to the respective lines from the telephone company. Surge protection and reverse polarity protection are provided in a conventional manner by the protection circuit 26. In order to initialize the annunciator 10, power is initially provided from a ring detector 28, a voltage regulator 32 and an energy storage and filter circuit 34. When the telephone set 14 is called, the ringing voltage from the telephone line is applied to the ring detector 28 through the protection circuit 26. The ring detector is capacitively coupled by capacitors 54 and 56 to the telephone line and includes a full wave rectifier which develops a positive DC voltage which is applied to the voltage regulator 32. The regulated voltage from regulator 32 is applied across a storage capacitor 36 which is connected in parallel with a filter capacitor 38. The storage capacitor 36 is charged by each of the successive current bursts in the ring signal and holds a sufficient charge for about five seconds after each burst to allow the annunciator 10 to listen for an off-hook signal which will occur if and when the user lifts the hand set from the cradle of telephone set 14.

The off-hook detector 42 is powered by the voltage on the storage capacitor 36 during ringing and for about five seconds after the last ring. During this time it is listening for an off-hook signal. When the handset is lifted from the cradle the telephone switch hooks are closed and the voltage on the telephone line drops significantly to a low level, typically a value of around 10 volts. Thus, a circuit including zener diode 44 causes the transistor 46 to turn off. Switching of transistor 46 from on to off causes the main power supply 48 to turn on as will be described presently. In order to ensure reliable operation of the off-hook detector 42, the detector is provided with a time constant control circuit including a transistor 52. Transistor 52 is turned on by the voltage across storage capacitor 36 and is effective to bleed the capacitors 54 and 56 in the ring detector so that the time constant of the circuit is reduced to provide faster and more reliable operation of the off-hook detector 42.

The main power supply 48 is controlled by a power supply switch 58 which, in turn, is controlled by the off-hook detector 42. When transistor 46 in the off-hook detector 42 is turned off, the transistor 62 is also turned off and this, in turn, causes the transistor 64 in the main power supply 48 to be turned on. Accordingly, current flows from the telephone line through the protection circuit 26 and transistor 64, resistor 66 to charge the storage capacitor 36. This provides for the annunciator 10 to be powered from the telephone line through the main power supply 48.

With the annunciator being powered by the main power supply 48, the annunciator is listening for either an on-hook signal which would turn off the main power supply 48 or a "star code" signal which is produced on the telephone line by the activation of the "star" button on the telephone set 14. The star code signal activates playback of a prerecorded response message to the party who initiated the telephone call, as will be described below. If the user of the annunciator 10 hangs up, the switchhook will be open and voltage will no longer be supplied from the telephone line to the annunciator which will then become dormant unless the message is being played. In that case, the annunciator will hold the line in the off-hook condition to finish the message and then hang up.

The DTMF (dual tone multiple frequency) decoder circuit 72 receives DTMF signals from the telephone line and is capable of producing a coded output representing any one or all of the Touchtone™ buttons of the telephone set 14. The DTMF decoder circuit 72 includes a DTMF decoder 74 which is an integrated circuit identified as MT88L7OAS available from Mitel. A DTMF wake up circuit 76 applies a wake up signal to the decoder 74 in response to the initializing voltage across the storage capacitor 36 in the circuit 34. The DTMF decoder produces the decoded output on pins Q1, Q2, Q3 and Q4 corresponding to each DTMF signal on the telephone line. The decoder outputs are applied to the star code signal detector 78 which responds only to the star code.

The star code signal detector 78 produces a "talk trigger" signal which is applied to the voice ROM on/off circuit 82. The talk trigger signal, is applied to the C input of the flip flop 84 causing the Q-not output to go high since the data line is low. (Flip flop 84 is a dual D flip flop 4013 available from Motorola.) This causes the input of the transistor 86 to go low which is applied as a switching signal to the voice ROM turn on circuit 88. This turns on the transistor 92 in the voice ROM turn on circuit 88. Transistor 92 supplies power from the power supply 48 to the voice ROM power supply 94 which supplies power to the voice ROM 96.

The voice ROM 96 is an integrated circuit MSS2105-701N available from Mosel. The voice ROM is custom programmed with a voice message which is to be played back from the ROM in analog form onto the telephone line. When the talk trigger signal is applied to the flip flop 84 it is also applied to the voice ROM start circuit 98 which includes transistor 102. The talk trigger signal turns on the transistor 102 which activates the voice ROM 96 to initiate the message playback. As long as the message playback continues, the "busy" pin on the voice ROM 96 is high and provides a signal to turn transistor 86 on. This keeps the voice ROM 96 turned on. When the playback of the message comes to an end, the busy pin goes low and transistors 86 and 92 turn off which turns off voice ROM power supply 94 and the voice ROM 96 is deactivated.

The output of the voice ROM is an analog signal voltage which represents the recorded voice signal. This output analog signal is applied to the input of the line current modulator 97 which includes transistor 104. The analog signal is applied to the input of the transistor 104 which is connected across transistor 92 in the voice ROM turn on circuit 88. Accordingly, the analog signal modulates the telephone line current and thus reproduces the prerecorded message at the receiver of the calling party and at the receiver of the telephone set 14.

If user of the annunciator 10 desires for some reason to interrupt the playback of the message from the voice ROM 94 before completion of the message, the star button must be pressed a second time. This will cause the star code signal detector 78 to produce a second talk trigger signal. (The second talk trigger signal is interpreted as a "no talk" trigger signal.) When the second talk trigger signal is applied to the flip flop 84 it causes the Q-not output to go low which turns off the transistor 86 in the voice ROM on/off circuit 82. This turns off the transistor 92 in the voice ROM turn on circuit 88 and thereby disconnects the voice ROM power supply 94 from the main power supply 48. This deactivates the voice ROM 96 and the message is terminated.

The annunciator 10 is ready for operation once it is installed with the telephone set as described above. In operation, the annunciator will be dormant until an incoming call rings the telephone set and causes the annunciator to be initialized so that it is in readiness to respond to an off-hook signal from the telephone set. The annunciator will be activated to produce the stored message only when the star code signal is produced on the telephone line by the user pressing the star button on the telephone set. The annunciator then "speaks" the prerecorded message into the telephone line. After it has played back the complete message, it will hang up the telephone set and return to its dormant stage. After the telephone user has pressed the star button, the user may either remain on the line and "listen in" or hang up. If the user hangs up before the message is complete, the annunciator keeps the line open to finish the message. If the telephone user does not hang up before the message is completed, the line remains open until the user does hang up. If the user desires to interrupt the play back of the recorded message, the user must press the star button a second time which operates to stop the play back and the line remains open between the user's telephone set and the calling party's telephone set.

In typical usage of the telephone set, the telephone user will desire to activate the annunciator to play the recorded message only in case of selected calls. In case the user receives an incoming call which is selected for use of the annunciator, the annunciator operates in the following manner. When the call is received, the annunciator detects the ring and it "listens" for an off-hook signal as long as the telephone continues to ring. If there is no off-hook signal, the annunciator becomes dormant and stops listening. If the user picks up the telephone the annunciator detects the off-hook signal. It then "listens" for star code signal and also listens for an on-hook signal. While the user has a conversation with the calling party, the annunciator continues to listen for the star code signal or an on-hook signal. When the user hangs up the telephone is disconnected from the line and the annunciator returns to its dormant state in which it listens for a ring signal.

In case the user receives a telephone call which is not selected by the user for use of the annunciator, the annunciator operation is as follows. When the incoming call is received, the annunciator detects the ring signal and listens for an off-hook signal. When the user picks up the telephone the annunciator detects the off-hook signal and listens for a star code signal or an on-hook signal. At any time after the user takes the telephone set off-hook, during conversation or before conversation, the user may press the star button on the user's telephone set and the annunciator plays the recorded message. (During the play back of the recorded message the annunciator listens for either a star code signal or an on-hook signal.) If, after pressing the star button, the user hangs up, the annunciator will continue playing the recorded message until it is finished and then it will hang up.

The annunciator operates in the following manner in case of an incoming call which is not answered. The annunciator detects the ring signal and is initialized for responding to subsequent control signals. Since there is no off-hook signal within a predetermined time after the last ring, the annunciator goes dormant without activating play back of the message.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. An annunciator for use with a telephone set having a keypad thereon and which is connected with a telephone line, said annunciator comprising:

a pair of input terminals for connection of the annunciator with the telephone line, a voice ROM for storing a message and for producing an audio signal corresponding to said message when activated, said voice ROM having a pre-recorded voice message stored thereon, a line current modulator having an input coupled with said voice ROM and an output adapted to be coupled with said telephone line, an on/off control circuit for said voice ROM for selectively turning said voice ROM on and off, a decoder for producing a trigger signal, said decoder having an input adapted to be coupled with said telephone line and responsive to a predetermined DTMF code which is produced on the telephone line when the telephone user presses a predetermined key of the telephone keypad, said on/off control circuit being coupled with said decoder and responsive to said trigger signal for turning on said voice ROM whereby the telephone line current is modulated by said line current modulator in accordance with the audio signal from said voice ROM, a start-up power supply including a a rectifier coupled with said input terminals by at least one DC blocking capacitor and a storage capacitor connected with said rectifier for storing a DC charge in response to a ring signal on the telephone line, a main power supply for supplying electrical power to the annunciator after said telephone set goes off-hook, and an off-hook detector circuit powered by the start-up power supply and responsive to an off-hook signal from said telephone set for connecting the main power supply to the telephone line to receive power therefrom.

2. The invention as defined in claim 1 wherein:

said start-up power supply includes a ring detector connected across said input terminals for producing a DC output voltage in response to the ring signal on said telephone line.

3. The invention as defined in claim 1 wherein:

said start-up power supply further includes a full wave rectifier connected across said input terminals through a coupling capacitor, said rectifier being coupled with said storage capacitor for charging said capacitor in response to a ring signal on the telephone line.

4. The invention as defined in claim 3 including, a time constant control circuit coupled with the storage capacitor and the coupling capacitor for bleeding the coupling capacitor in response to the charge on said storage capacitor.

5. An annunciator for use with a telephone set having a keypad thereon and which is connected with a telephone line, said annunciator comprising:

a pair of input terminals for connection of the annunciator with the telephone line, a voice ROM for storing a message and for producing an audio signal corresponding to said message when activated, said voice ROM having a pre-recorded voice message stored thereon, a line current modulator having an input coupled with said voice ROM and an output adapted to be coupled with said telephone line, an on/off control circuit for said voice ROM for selectively turning said voice ROM on and off, a decoder for producing a trigger signal, said decoder having an input adapted to be coupled with said telephone line and responsive to a predetermined DTMF code on the telephone line when the telephone user presses a predetermined key of the telephone keypad, and said on/off control circuit being coupled with said decoder and responsive to said trigger signal for turning on said voice ROM whereby the telephone line current is modulated by said line current modulator in accordance with the audio signal from said voice ROM.

6. A method of operating an annunciator for a telephone, said annunciator comprising:

a pair of input terminals connected with the telephone line, a voice ROM for storing a message and for producing an audio signal corresponding to said message when activated, said voice ROM having a pre-recorded voice message stored thereon, a line current modulator having an input coupled with said voice ROM and an output coupled with said telephone line, an on/off control circuit for said voice ROM for selectively turning said voice ROM on and off, and a decoder for producing a trigger signal and having an input coupled with said telephone line and responsive to a predetermined DTMF code which is produced on the telephone line when the telephone user presses a predetermined key of the telephone keypad, said on/off control circuit being coupled with said decoder and responsive to said trigger signal for activating said voice ROM and said modulation for modulating the telephone line current in accordance with the audio signal from said voice ROM, said method comprising the following steps which are performed by the user of the annunciator picking up the handset of said telephone in response to ringing of the telephone, listening to the caller long enough to decide whether or not to proceed with the call, if there is a decision against proceeding with the call, pressing said predetermined key on the telephone keypad to produce said trigger signal whereby the annunciator performs the following step:

activating said voice ROM and said modulator to initiate playback of said message to the caller.

7. The method as defined in claim 6 including the following steps performed by the user, hanging up the handset after pressing said predetermined key on the telephone keypad.

8. The invention as defined in claim 6 including the following steps performed by the user:

staying on the line after pressing said predetermined key on the telephone keypad and listening for further information from the caller.

* * * * *